J. J. AHEARN.
PORTABLE WATER HEATER.
APPLICATION FILED MAR. 19, 1918.
1,292,414.
Patented Jan. 28, 1919.
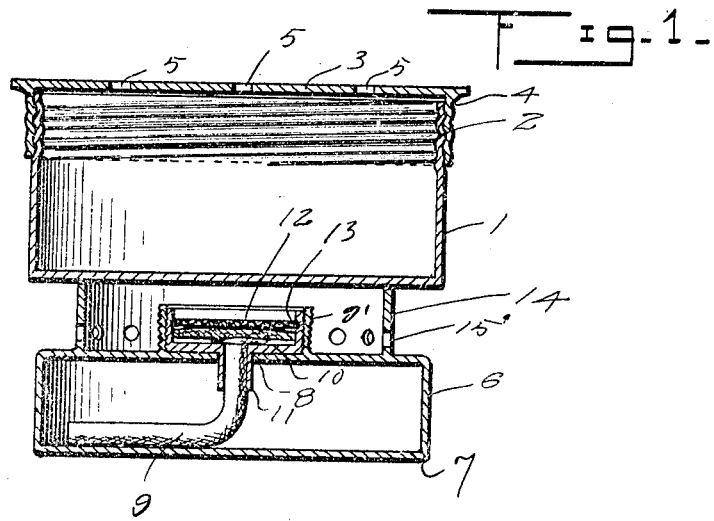
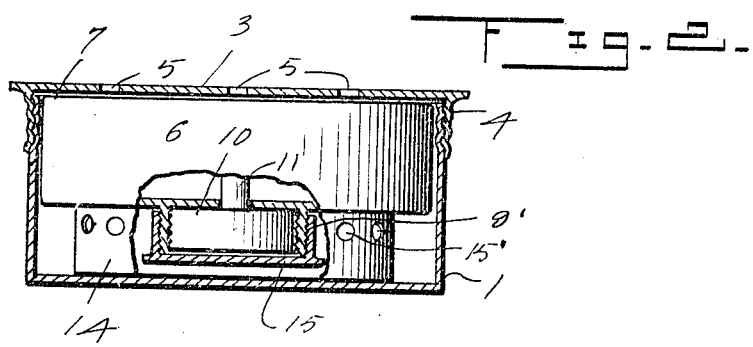
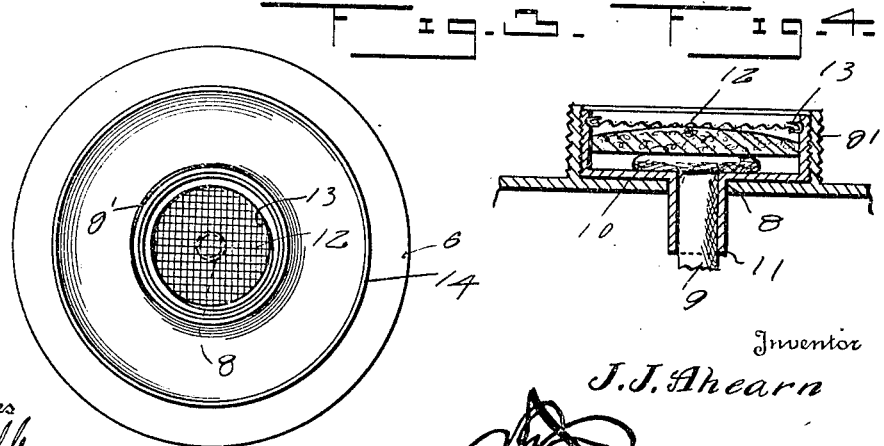
Witnesses
Inventor
J. J. Ahearn
By
Attorney

UNITED STATES PATENT OFFICE.

JOHN J. AHEARN, OF PALMER, NEW YORK, ASSIGNOR OF ONE-THIRD TO DENNIS O'BRIEN, OF PALMER, NEW YORK.

PORTABLE WATER-HEATER.

1,292,414.   Specification of Letters Patent.   Patented Jan. 28, 1919.

Application filed March 19, 1918. Serial No. 223,414.

*To all whom it may concern:*

Be it known that I, JOHN J. AHEARN, a citizen of the United States, residing at Palmer, in the county of Saratoga and State of New York, have invented certain new and useful Improvements in Portable Water-Heaters; and I do hereby declare the following to be a full, clear, and exact description of the invention, such as will enable others skilled in the art to which it appertains to make and use the same.

This invention relates to improvements in a portable water heater and has for one of its objects the provision of a device of this character which can be disassembled and placed into a compact article so that the same can be conveniently carried in a pocket and which can be assembled ready to heat water of a sufficient quantity for shaving and like purposes, thereby providing a device adaptable for tourists, soldiers, hunters, and the like.

Another object of this invention is the provision of a receptacle adapted to contain water and supported by a burner which heats the same and which can be inverted and placed in the receptacle when not using the device providing a compact article.

A further object of this invention is the provision of means for preventing the fuel from spilling or wasting from the burner when the burner is inverted and placed in the receptacle.

A still further object of this invention is the provision of a portable water heater of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention reference is to be had to the following description and accompanying drawings, in which:—

Figure 1 is a vertical sectional view of a portable water heater constructed in accordance with my invention.

Fig. 2 is a similar view illustrating the device disassembled to provide a compact article.

Fig. 3 is a plan view of the burner, and

Fig. 4 is a fragmentary vertical sectional view of the burner.

Referring in detail to the drawing, the numeral 1 indicates a cylindrical receptacle having the upper edge of its wall pressed to form screw threads 2. A cover 3 has an annular flange 4 formed thereon which is pressed to form screw threads for coöperation with the screw threads of the receptacle 1 in securing the cover to the receptacle. The top wall of the cover 3 is provided with a plurality of openings 5 for the purpose of permitting the steam from the water contained within the receptacle to escape therefrom.

A burner 6 consists of a cylindrical bowl 7 adapted to contain alcohol or like fuel and is provided with a central opening 8 in the top wall thereof for the purpose of permitting the bowl 7 to be filled with the fuel and also for the reception of a wick 9. The wick 9 is constructed from cotton or other similar material wound into wick formation. A circular collar $9^1$ that is internally and externally screw threaded is formed upon the top wall of the bowl 7 about the opening 8 and has threaded therein a cup shaped member 10 provided with a central opening in the bottom wall thereof adapted to aline with the opening 8 in the bowl 7. A cylindrical extension 11 is formed upon the bottom wall of the cup-shaped member 10 about the opening therein and extends through the opening 8 permitting the wick to pass from the bowl 7 into the cup-shaped member 10. After the wick has passed into the cup-shaped member 10 it is flared so as to overlie the bottom wall thereof to provide an increased burning surface to the wick. A foraminous disk 12 constructed from asbestos or similar material is surrounded by a ferrule 13 that is seated within an annular groove formed within the cup-shaped member 10 so as to support the disk in spaced relation to the upper end of the wick and providing a construction wherein the fuel will be burned through the disk 12 by capiliary attraction.

A cylindrical supporting member 14 is formed upon the top wall of the bowl 7 about the cylindrical member $9^1$ and in spaced relation thereto and is adapted to support the receptacle 1 directly over the burner and is provided with a plurality of apertures 15¹ for the purpose of permitting the draft to the flame of the burner.

In operation, the receptacle 1 is filled or partially filled with water and the wick is then ignited and the receptacle placed upon the cylindrical supporting member so that the flame from the wick will play directly against the bottom of the receptacle so as to thoroughly and quickly heat the water therein. When desiring to carry the device in a pocket, the receptacle 1 is removed from the supporting member 14 and a cap 15 is threaded to the collar 9¹ so as to prevent the fuel in the bowl 7 from spilling or draining therefrom. The bowl 7 is then placed within the receptacle 1 in an inverted position as clearly illustrated in Fig. 2, permitting the supporting member 14 to rest upon the bottom wall of the receptacle. The cover 3 is then placed upon the receptacle 1 so that the device can be readily placed within a pocket or other convenient place.

While I have shown and described the preferred embodiment of my invention, it will be understood that minor changes in construction, combination and arrangement of parts may be made without departing from the spirit and scope of the invention as claimed.

What I claim is:—

1. A portable water heater comprising a bowl, an integral supporting member on said bowl and having spaced openings, a circular collar formed on said bowl, a cup-shaped member secured within said circular member and in communication with the bowl, a wick extending from the bowl into the cup-shaped member, and a receptacle carried by the supporting member.

2. A portable water heater comprising a bowl, a supporting member on said bowl, said bowl having a central opening in the top wall thereof, a circular collar formed upon said bowl and surrounding said opening, a cup-shaped member threaded into said collar and having a central opening in the bottom wall thereof, a cylindrical extension formed upon the bottom wall of the cup and extending through the opening in the bowl, a wick extending from the bowl to the cylindrical extension into the cup, a foraminous disk carried by said cup and spaced from the wick, a supporting member carried by said bowl and a receptacle carried by said supporting member.

In testimony whereof I affix my signature in presence of two witnesses.

JOHN J. AHEARN.

Witnesses:
ALICE V. K. AHEARN,
FRANK P. AHEARN.

Copies of this patent may be obtained for five cents each, by addressing the "Commissioner of Patents, Washington, D. C."